(12) United States Patent
Jiang (10) Patent No.: US 12,267,105 B2
(45) Date of Patent: Apr. 1, 2025

(54) SYSTEM AND METHOD FOR MONITORING OPTICAL PERFORMANCE IN A SPATIAL DIVISION MULTIPLEXING SYSTEM

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 151 days.

(21) Appl. No.: 18/161,386

(22) Filed: Jan. 30, 2023

(65) Prior Publication Data
US 2024/0259094 A1  Aug. 1, 2024

(51) Int. Cl.
*H04B 10/077* (2013.01)
*H04L 5/00* (2006.01)

(52) U.S. Cl.
CPC ....... *H04B 10/0775* (2013.01); *H04L 5/0048* (2013.01)

(58) Field of Classification Search
CPC .......... H04B 2210/075; H04B 2210/07; H04B 10/077; H04B 10/0775
See application file for complete search history.

(56) References Cited

U.S. PATENT DOCUMENTS

| | | | | |
|---|---|---|---|---|
| 7,123,788 B2 * | 10/2006 | Jung | ................. | H04B 10/0775 385/24 |
| 10,148,351 B2 | 12/2018 | Jiang et al. | | |
| 2004/0208525 A1 * | 10/2004 | Seydnejad | ......... | H04B 10/0775 398/33 |
| 2011/0200327 A1 * | 8/2011 | Qi | ....................... | H04J 14/0246 398/79 |
| 2017/0244479 A1 * | 8/2017 | Jiang | ..................... | H04B 10/69 |

OTHER PUBLICATIONS

Ji et al., Optical performance monitoring techniques based on pilot tones for WDM network applications, Journal of Optical Networking, vol. 3, No. 7, p. 510-533, Jul. 2004.
Jiang, Z. et al., Progresses of Pilot Tone Based Optical Performance Monitoring in Coherent Systems, Journal of Lightwave Technology, vol. 40, No. 10, p. 3128-3136, May 15, 2022.

* cited by examiner

*Primary Examiner* — Pranesh K Barua
(74) *Attorney, Agent, or Firm* — BCF LLP (57) ABSTRACT

The disclosed systems and methods are for monitoring optical performance in a spatial division multiplexing (SDM) system, comprising: i) extracting, by an optical coupler, at least a portion of a plurality optical signals propagating in different communication lanes of the SDM-based optical communication system, wherein each optical signal of the plurality of optical signals is modulated with a distinguishable pilot tone (PT) signal; ii) combining, by the optical coupler, the extracted portion of the plurality of optical signals, and generate a combined optical signal; iii) extracting, by a pilot tone detector (PTD), PT signals from the combined optical signal; iv) determining, by the PTD, optical signal specific information included in the PT signals; and v) computing, by the PTD, optical power of each optical signal based on the optical signal specific information.

12 Claims, 12 Drawing Sheets

SYSTEM AND METHOD FOR MONITORING OPTICAL PERFORMANCE IN A SPATIAL DIVISION MULTIPLEXING SYSTEM

TECHNICAL FIELD

The present disclosure generally relates to optical networks and, in particular, to a system and a method for monitoring optical performance in a spatial division multiplexing (SDM) system.

BACKGROUND

Conventional optical communication systems, such as, for example, dense wavelength division multiplex (DWDM) optical transmission and switching systems are configured to combine and simultaneously transmit multiple optical signals operating at different wavelengths along optical fibers at high speeds. With an increase in high data-throughput demands, single lane fiber optic-based communications systems are progressing towards spatial division multiplexing (SDM) system. The SDM system typically includes more than one single lane fiber optic-based communications systems.

Optical performance monitoring is typically used for managing the high capacity SDM system. Generally, optical performance monitoring involves assessing the quality of data channels by measuring its optical characteristics without directly looking at the transmitted sequence of bits. In optical communication, typical roles for optical performance monitoring include ensuring correct switching in reconfigurable optical add-drop multiplexers, setting power levels for dynamic equalization of the gain of optical amplifiers, and providing system alarms and error warning for lost or out of specification optical channels.

Conventionally, in the SDM system, to monitor optical performance multiple optical performance monitors (OPMs) are required. Each lane in the SDM system requires a dedicated OPM. This requirement of multiple OPMs in the SDM system increases an overall hardware cost of the SDM system.

With this said, there is an interest in developing efficient systems and methods for monitoring optical performance in a spatial division multiplexing system.

SUMMARY

The embodiments of the present disclosure have been developed based on developers' appreciation of the limitations associated with the prior art. Namely, in the conventional spatial division multiplexing (SDM) system, to monitor optical performance, each lane required dedicated OPM that adds to the hardware complexity.

The developers have devised a system and a method for monitoring optical performance in a spatial division multiplexing (SDM) system. More particularly, the SDM system, in accordance with various embodiments of the present disclosure, relies on a single optical coupler and a single pilot tone detector to monitor optical performance across various lanes, thereby simplifying the SDM system implementation in terms of hardware complexity.

In accordance with a first broad aspect of the present disclosure, there is provided a system for monitoring optical performance in a spatial division multiplexing (SDM)-based optical communication system, comprising: an optical coupler configured to: extract at least a portion of a plurality optical signals propagating in different communication lanes of the SDM-based optical communication system, wherein each optical signal of the plurality of optical signals is modulated with a distinguishable pilot tone (PT) signal; combine the extracted portion of the plurality of optical signals, and generate a combined optical signal; and a pilot tone detector (PTD) configured to extract PT signals from the combined optical signal, determine optical signal specific information included in the PT signals, and compute optical power of each optical signal based on the optical signal specific information.

In accordance with any embodiments of the present disclosure, each one of the plurality of optical signals is modulated with a different PT signal having a different operational frequency.

In accordance with any embodiments of the present disclosure, a given set of optical signals associated with a given communication lane are modulated by a set of PT signals which are multiplexed with a unique code, the unique code is different for different communication lanes.

In accordance with any embodiments of the present disclosure, different optical signals having same wavelength propagating in different communication lanes are modulated with a same PT signal, provided at a given instant of time only one of the different optical signals is modulated with the same PT signal.

In accordance with any embodiments of the present disclosure, the optical signal specific information includes one or more of central wavelength, modulation format, baud rate, spectrum shape, and source/destinations.

In accordance with a second broad aspect of the present disclosure, there is provided a spatial division multiplexing (SDM) based optical communication system comprising: a plurality of communication lanes, each communication lane comprises: a plurality of transmitters configured to modulate a plurality of optical signals with distinguishable pilot tone (PT) signals; a multiplexer configured to multiplex the plurality of modulated optical signals; an optical fiber configured to carry the multiplexed modulated optical signals; an optical coupler coupled to the optical fiber of each communication lane and configured to: extract at least a portion of the multiplexed modulated optical signals propagating in each communication lane; combine the extracted portion of the multiplexed modulated optical signals, and generate a combined optical signal; and a pilot tone detector (PTD) configured to extract PT signals from the combined optical signal, determine optical signal specific information included in the PT signals, and compute optical power of each optical signal based on the optical signal specific information.

In accordance with a third broad aspect of the present disclosure, there is provided a method for method for monitoring optical performance in a spatial division multiplexing (SDM)-based optical communication system, comprising: extracting, by an optical coupler, at least a portion of a plurality optical signals propagating in different communication lanes of the SDM-based optical communication system, wherein each optical signal of the plurality of optical signals is modulated with a distinguishable pilot tone (PT) signal; combining, by the optical coupler, the extracted portion of the plurality of optical signals, and generate a combined optical signal; extracting, by a pilot tone detector (PTD), PT signals from the combined optical signal; determining, by the PTD, optical signal specific information included in the PT signals; and computing, by the PTD, optical power of each optical signal based on the optical signal specific information.

BRIEF DESCRIPTION OF THE DRAWINGS

The features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures are not intended to limit the scope of the claims.

DETAILED DESCRIPTION

The instant disclosure is directed to addressing at least some of the deficiencies of the conventional techniques used to monitor optical performance in the spatial division multiplexing (SDM) system. In particular, the instant disclosure describes efficient systems and methods for monitoring optical performance in a spatial division multiplexing system.

Unless otherwise defined or indicated by context, all technical and scientific terms used herein have the same meaning as commonly understood by one of ordinary skill in the art to which the described embodiments appertain to.

In the context of the present specification, "controller" is any computer hardware that is capable of running software appropriate to the relevant task at hand. In the context of the present specification, in general the term "client device" is associated with a user of the client device. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the server, nor is their use (by itself) intended to imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes efficient systems and methods for monitoring optical performance in a spatial division multiplexing (SDM) system.

Figure 1:
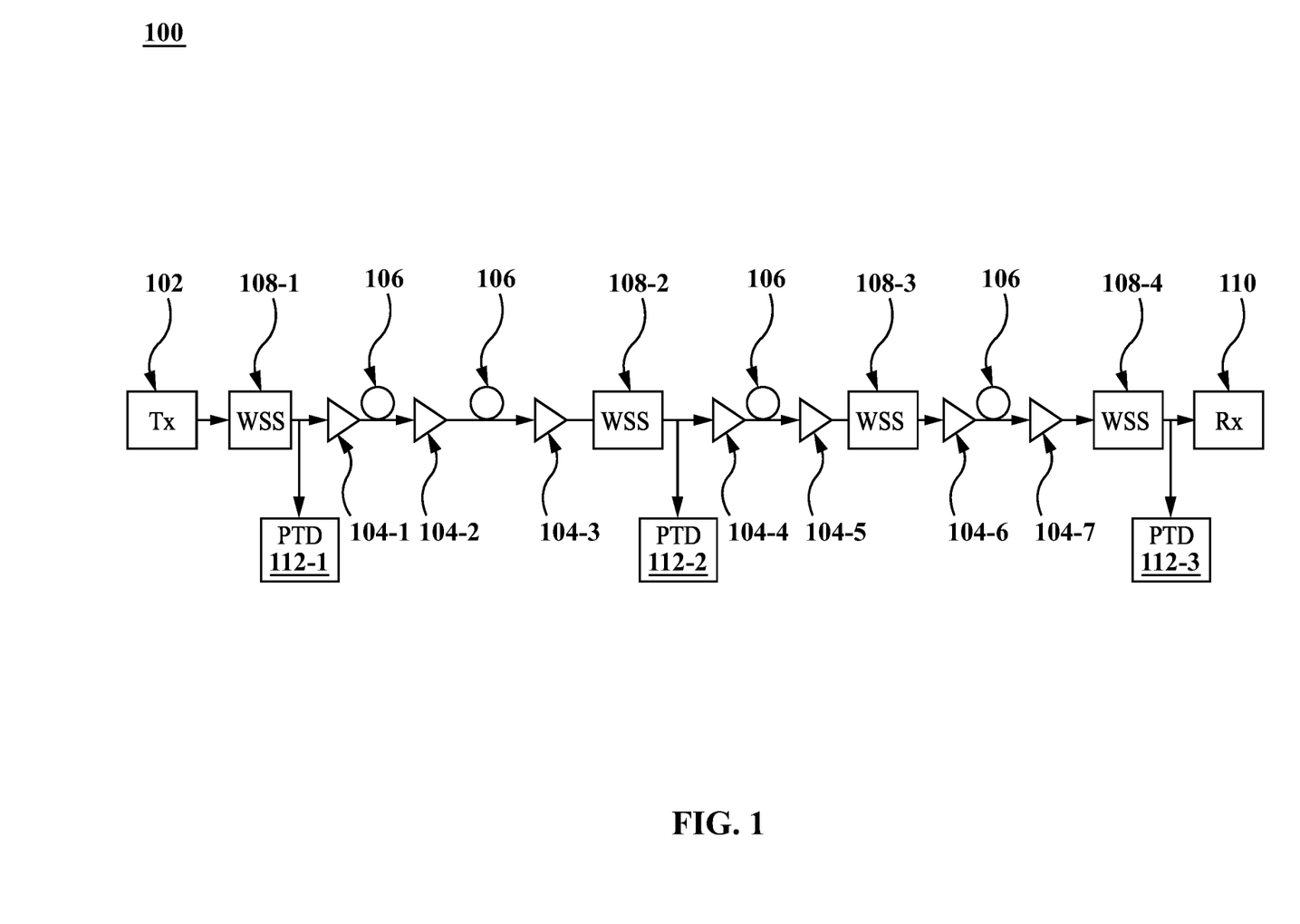
FIG. 1 (Prior Art) illustrates a dense wavelength division multiplexing (DWDM) optical link.

Referring now to the drawings, FIG. 1 (Prior Art) illustrates a dense wavelength-division multiplexing (DWDM) optical link 100. As shown, the DWDM link 100 may include a transmitter 102, optical amplifiers 104-1, 104-2, . . . 104-7, optical fibers 106, wavelength selective switches (WSSs) 108-1, 108-2, . . . 108-4, and a receiver 110. The DWDM optical link 100 may include other components. However, such components have not been illustrated for the purpose of simplicity.

The transmitter 102 may generate optical signals (interchangeably referred to as wavelength channels) to be transmitted over the optical fibers 106. The transmitter 102 may also incorporate one or more laser light sources configured to produce, emit, or radiate pulses of light with certain pulse duration. It is also contemplated that the emitted light may be single polarized, dual polarized, or randomly polarized, may have a particular polarization (e.g., linearly polarized, elliptically polarized, or circularly polarized) depending on the signal format.

The optical amplifiers 104-1, 104-2, . . . 104-7 may be located along the optical fibers 106. The optical amplifiers 104-1, 104-2, . . . 104-7 may be used to compensate the loss from the optical fibers 16 and the associated components. It is to be noted that, for the purpose of simplicity only one transmitter 102 and one receiver 110 have been illustrated. In various non-limiting embodiments, there may be a set of transmitters (each with a unique wavelength) and a set of receivers. Optical signals from the set of transmitters may be multiplexed by an optical multiplexer on the transmitter side and the multiplexed optical signals may be demultiplexed by a demultiplexer on the receiver side.

The WSSs 108-1, 108-2, . . . 108-4 in between the transmitter 102 and the receiver 110 may be used to drop and/or add wavelength channels, and route wavelength channels. The WSSs 108-1, 108-2, . . . 108-4 may act as optical filters. The WSSs 108-1, 108-2, . . . 108-4 may adjust/equalize the wavelength channel power.

In some embodiments, the DWDM optical link 100 may be a point-to-point optical link. In other non-limiting embodiments, the DWDM optical link 100 may be a portion of a mesh optical network with more advanced reconfigurable optical add-drop multiplexers (ROADMs) where the optical signals may be rerouted to different fibers at ROADM site. It will be appreciated that how the DWDM optical link 100 is implemented should not limit the scope of present disclosure.

The optical components, as referred to herein, comprise one or more passive and/or active optical network components and/or modules of the DWDM link 100, including, but not limited to, optical fiber, optical amplifiers, optical filters, optical links, WSSs, arrayed waveguide gratings, and laser light sources.

In the DWDM link 100, an amplitude modulation pilot tone (PT) signal may be used to monitor the channel power. The "amplitude modulation pilot tone signal" (also referred to herein as "PT signal") is configured to be a low-frequency (e.g., kHz to MHz) amplitude/intensity modulation applied to an optical signal. The PT signal may include single or multiple frequencies. The spectral characteristics of the PT signal should not limit the scope of the present disclosure.

The modulation depth and corresponding power of the PT signal is usually small (e.g., a few percent of the channel power). The PT signal provides an in-band ancillary channel for performance monitoring.

Each channel may be modulated with a different PT signal. For example, different modulation frequencies may be applied to different channels. Different spreading sequences may also be applied to spectra-spread PT signals. Accordingly, a power of a particular PT signal may be used for indicating the power of the optical signal in a wavelength division multiplexed (WDM) system. The PT signal may be further modulated to carry channel characterizing information.

In addition to the components discussed, the DWDM link 100 may include PT detectors (PTDs) 112-1, 112-2, and 112-3. In addition to the usual traffic data modulation, the transmitter 102 may receive a bit stream that may include channel specific information such as central wavelength, modulation format, baud rate, spectrum shape, source/destinations, etc. The transmitter 102 may convert the data bit stream into a coded data stream and encode a PT signal with the coded data stream to produce a coded PT signal. Further, transmitter 102 may modulate an amplitude of the optical signal with the coded PT signal. The steps of receiving, converting, encoding, and modulating may be performed by an encoder included in transmitter 102.

With this said, it will be appreciated that there are different types of PT signals that may be used. The most common is amplitude modulated PT (AM-PT, or PT for simplicity). The transmitter 102 may apply a small, relatively low frequency (kHz/MHz) amplitude/intensity modulation to the optical signal (GHz). Each optical signal may be applied with a unique low frequency PT signal.

Figure 2:
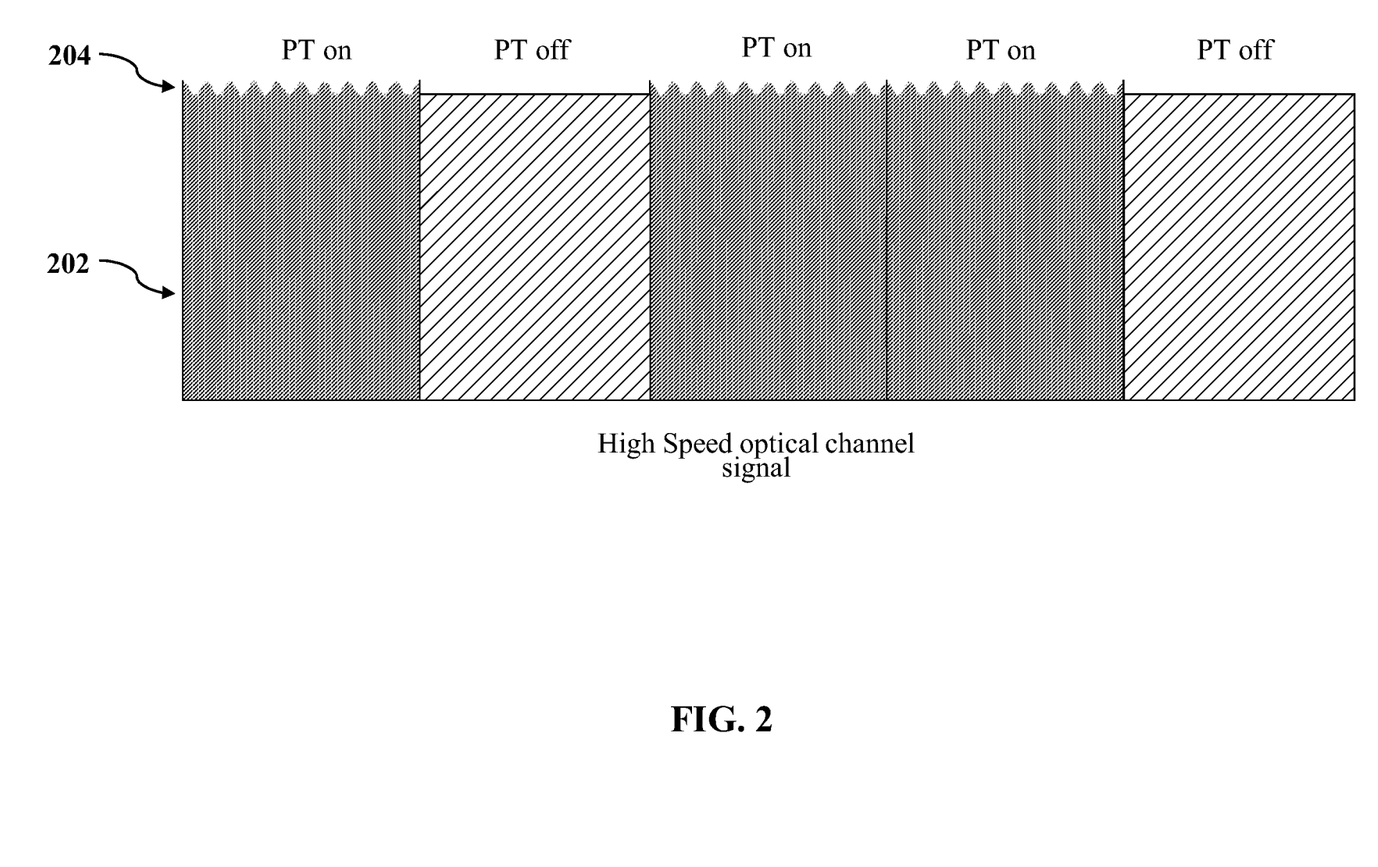
FIG. 2 (Prior Art) illustrates a representative optical signal with a pilot tone signal amplitude modulated over the representative optical signal.

In order to detect the PT signals, at least one photodetector (PD) may be used to detect all the optical signals without optical de-multiplexing. The existence and channel power of all optical signals may be simultaneously monitored by doing spectral analysis in electrical, or equivalently digital domain. This provides a low-cost monitoring solution. The PT signal may be further turned on and off to carry channel specific information. FIG. 2 (Prior Art) illustrates a representative optical signal 202 with a PT signal 204 amplitude modulated over the representative optical signal 202.

It is contemplated that with an increase in high data-throughput demands, single lane fiber optic-based communications systems, such as the DWDM link 100, are progressing towards spatial division multiplexing (SDM) system. The SDM system typically includes more than one single lane fiber optic-based communications systems.

Figure 3:
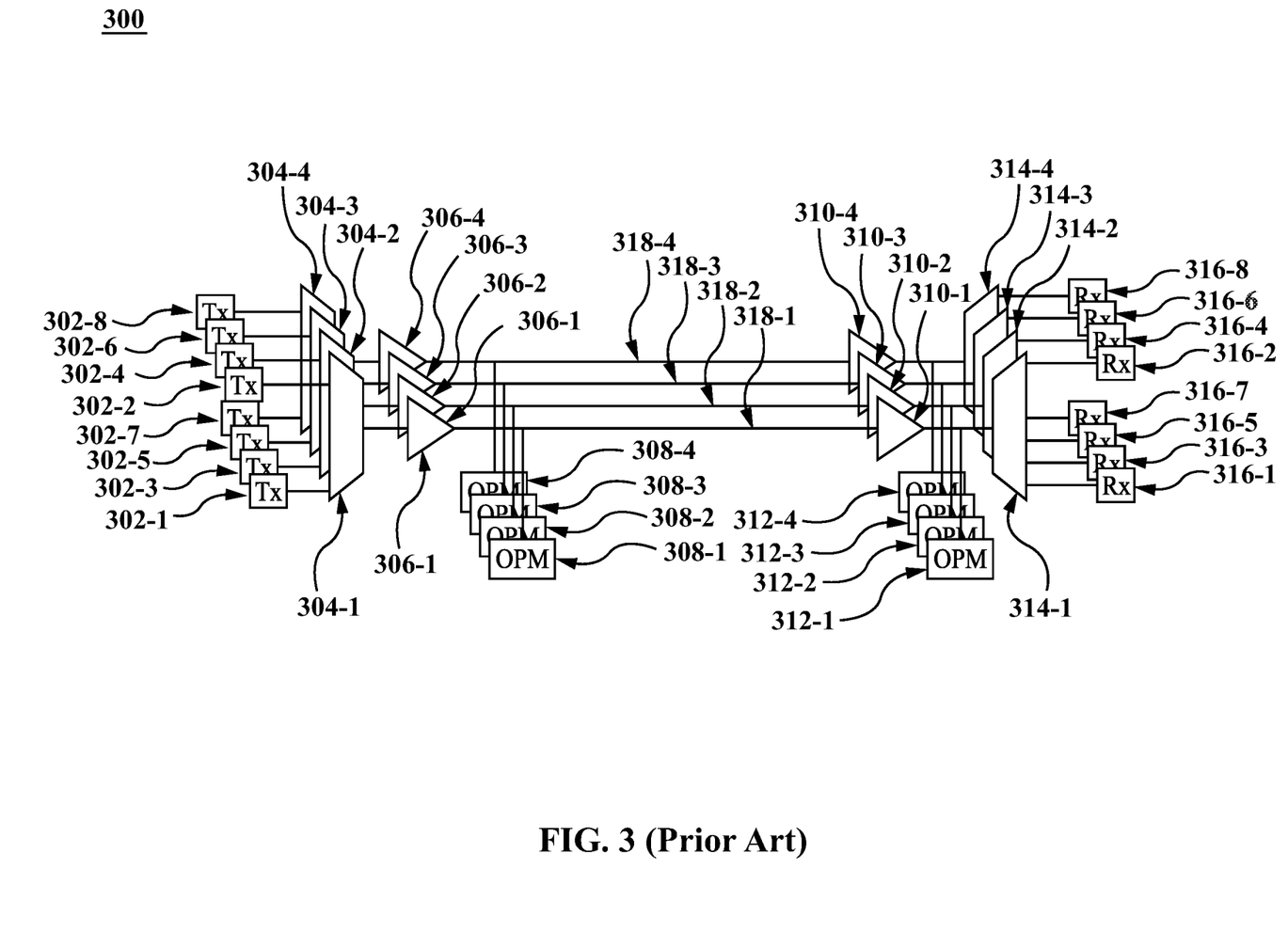
FIG. 3 (Prior Art) illustrates a conventional spatial division multiplexing (SDM) system.

FIG. 3 (Prior Art) illustrates a conventional SDM system 300. As shown, the conventional SDM 300 includes a plurality of single lane fiber optic-based communications systems. Each lane may be implemented similar to the DWDM link 100. For the purpose of simplicity, four lanes have been illustrated in the SDM system 300. In practical implementation, the conventional SDM system 300 may have N number of parallel lanes. Each lane includes a plurality of transmitters, multiplexers, optical amplifiers, demultiplexers, receivers, optical performance monitors (OPMs) and other optical components. By way of example, the first lane includes transmitters 302-1, and 302-2, a multiplexer 304-1, optical amplifiers 306-1, and 310-1, OPMs 308-1 and 312-1, a demultiplexer 314-1, and receivers 316-1 and 316-2. Different optical components in each lane are communicably coupled via optical fiber 318-1. Each of the four lanes includes similar components.

Figure 4:
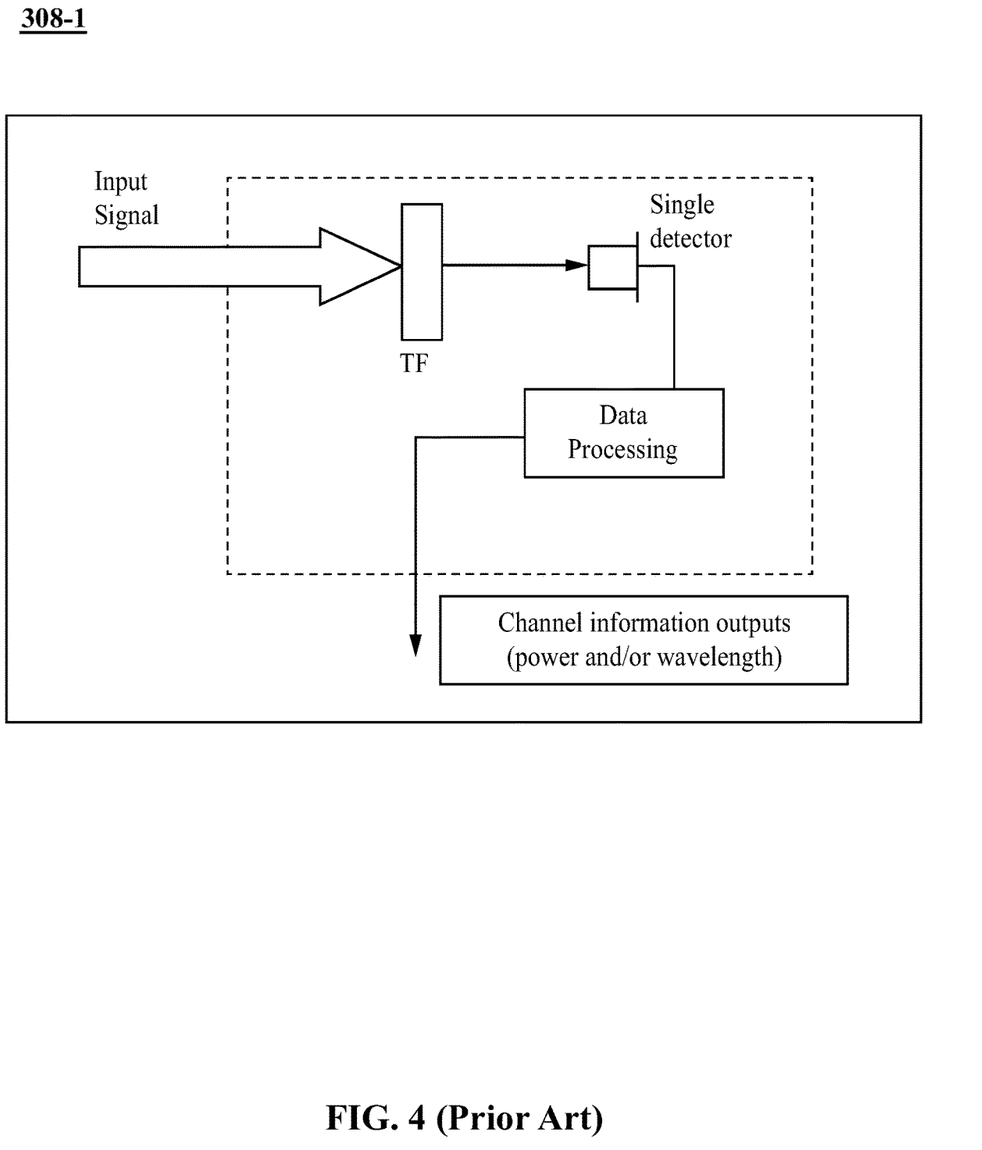
FIG. 4 (Prior Art) illustrates a conventional optical performance monitor (OPM) employed in the conventional SDM system.

To monitor the optical performance, each lane depends on a dedicated OPM. FIG. 4 (Prior Art) illustrates a conventional OPM 308-1 employed in the conventional SDM system 300. The conventional OPM 308-1 includes a tunable filter (TF), followed by a photodetector to obtain the spectrum of the input signal. With proper data processing, channel information, such as power and wavelength, can be derived. It is contemplated that TF is one possible implementation, there are other ways, such as a dispersive element (grating) plus a slit.

As previously discussed, in the conventional SDM system 300, to monitor optical performance, each lane required dedicated OPM that adds to the hardware complexity. Various embodiments of the present disclosure are directed towards simplifying the SDM implementation in terms of hardware complexity to monitor optical performance across various lanes.

Figure 5:
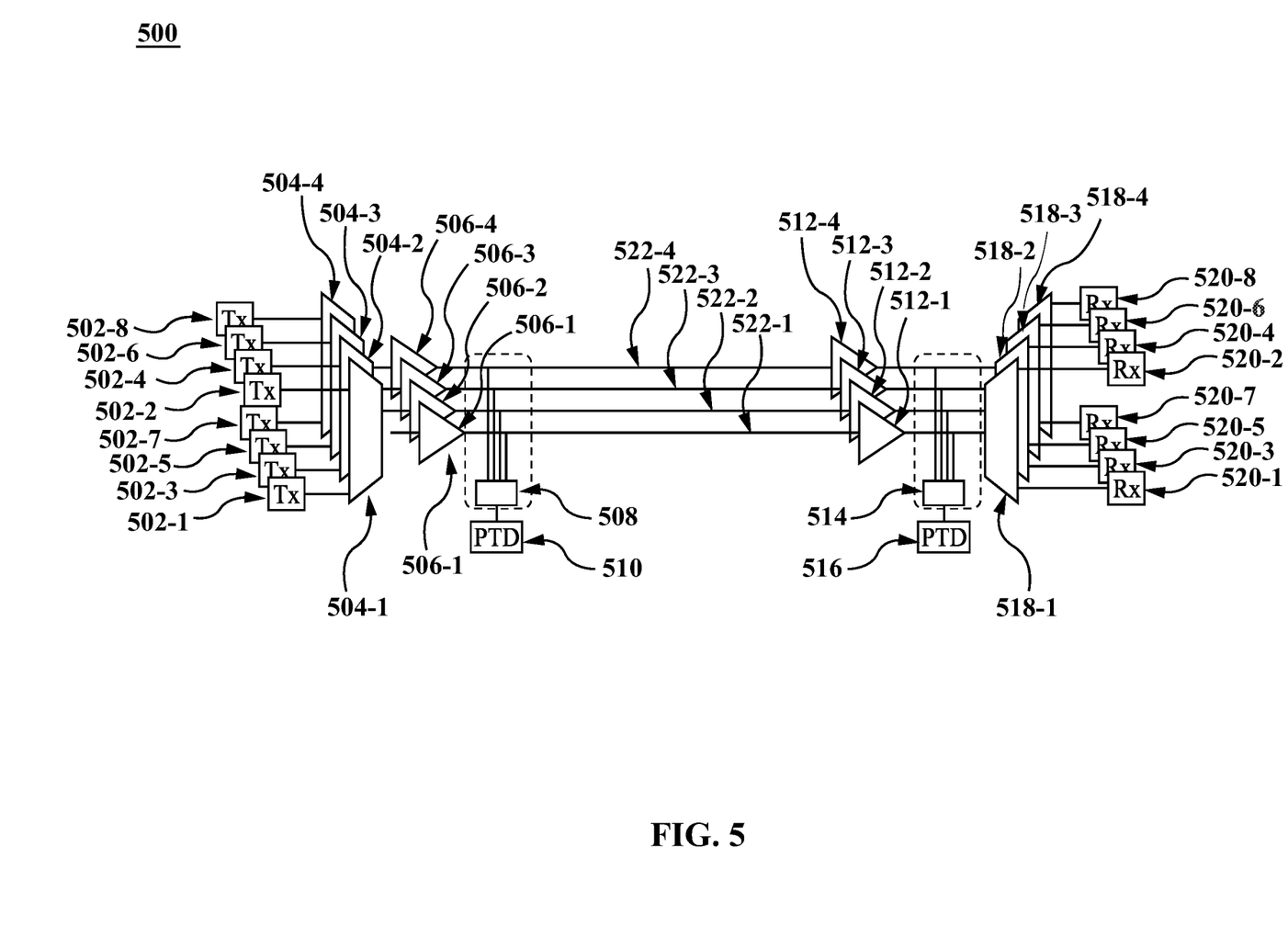
FIG. 5 illustrates a simplified SDM system, in accordance with various embodiments of the present disclosure.

With this said, FIG. 5 illustrates a simplified SDM system 500, in accordance with various embodiments of the present disclosure. While most of the components of the simplified SDM system 500 may be similar to the conventional SDM system 300, the plurality of OPMs may be replaced by an optical coupler and a PTD to reduce the hardware requirements.

The simplified SDM system 500 may include a plurality of parallel single lane fiber optic-based communications systems. Each lane may be implemented similar to the DWDM link 100. By way of example, a first lane in the simplified SDM system 500 may include transmitters 502-1, 502-2, a multiplexer 504-1, optical amplifiers 506-1, 512-1, a demultiplexer 518-1, and receivers 520-1, 520-2. Similarly, a second lane may include transmitters 502-3 and 502-4 with multiplexer 504-2, optical amplifiers 506-2, 512-2, demultiplexer 518-2, and receivers 520-3, 520-4. It will be appreciated that subsequent parallel single lane configurations may be implemented in a similar manner.

Different optical components in each lane are communicably coupled via optical fiber 522-1. Each of the four lanes may include similar components. Different optical fibers 522-1, 522-2, 522-3, and 522-4 may be coupled to an optical coupler 508 at a first location. The optical coupler 508 may be configured to extract some power from the optical signals propagating in the optical fibers 522-1, 522-2, 522-3, and 522-4 and combine them. The optical coupler 508 may provide the combined optical signal to the PTD 510.

It is to be noted that various embodiments of the present disclosure rely on PT signals superimposed on different optical signals propagating in different lanes of the simplified SDM system 500 to monitor optical performance. On each lane, multiple optical signals may be propagating, and the transmitters associated with each lane may superimpose PT signals over the multiple optical signals in such a manner that the PTD 510 is capable of determining which PT signal is associated to which lane and to which optical signal based on the combined optical signal.

Figure 6:
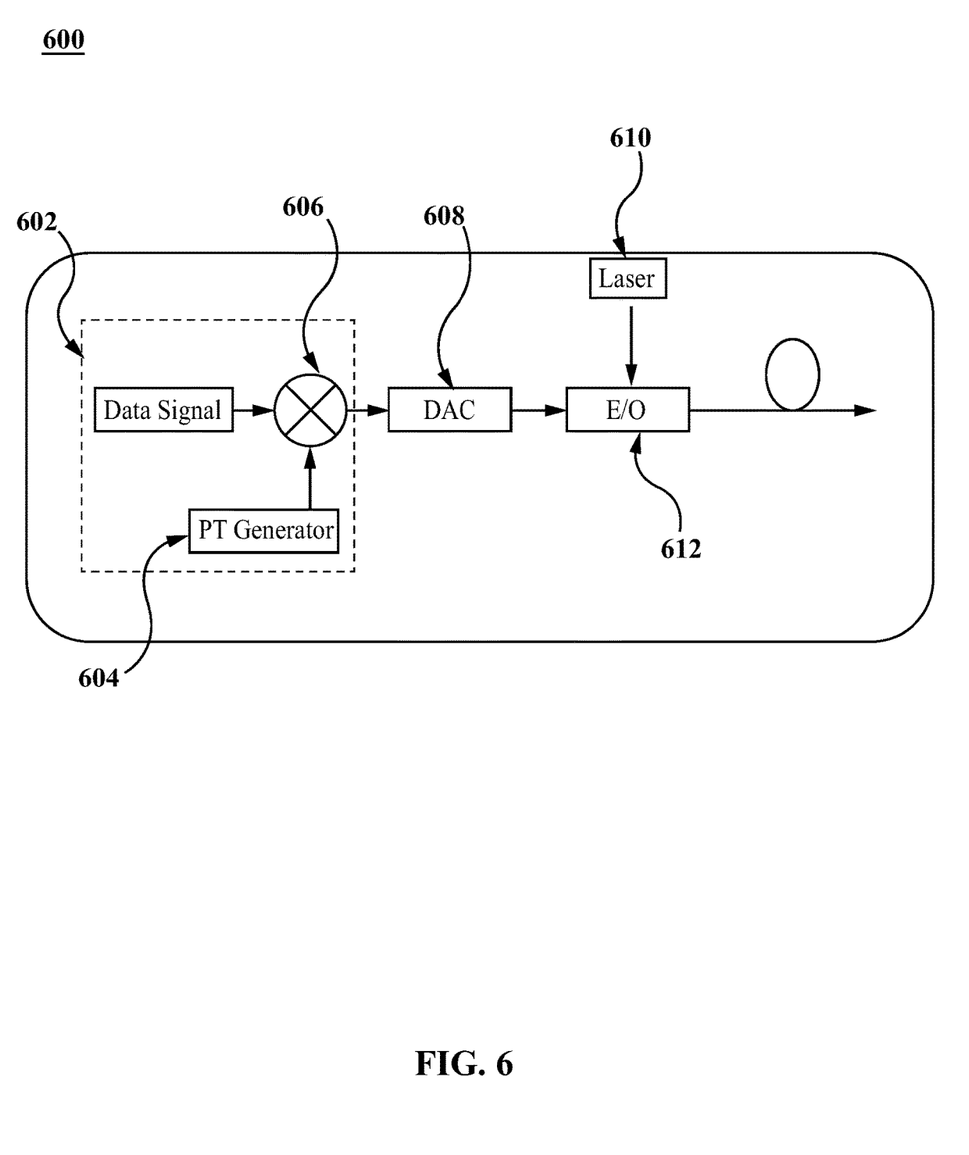
FIG. 6 illustrates a representative block diagram of a transmitter, in accordance with various non-limiting embodiments of the present disclosure.

FIG. 6 illustrates a representative block diagram of a transmitter 600, in accordance with various non-limiting embodiments of the present disclosure. As shown, the transmitter 600 may include a PT modulator 602, a digital to analog convertor (DAC) 608, a laser source 610, and an electrical to optical convertor (EOC) 612. The PT modulator 602 may include a PT generator 604, and a signal multiplier 606. It is to be appreciated, for a typical polarization multiplexed QAM transmitter, there may be 4 data streams (XI, XQ, YI, YQ), therefore there may be 4 DACs, and 4 EOCs. PT is applied to any one or all of these 4 data streams. The transmitter 600 may include additional components, however, such components have been omitted from the FIG. 6 for the purpose of simplicity. Further, it is contemplated that different transmitters, for example, transmitters 502-1, 502-2, . . . 502-8, as illustrated in FIG. 5, may be implemented similar to the transmitter 600.

The PT modulator 602 may receive a data signal to be propagated over one the lane in the simplified SDM system 500. The PT generator 604 may generate a PT signal to be distinguishably modulated over the data signal and the signal multiplier 606 may modulate the PT signal over the data signal.

To distinguishably identify the PT signals associated with each optical signal among different lanes, various techniques may be implemented by the different transmitters associated the simplified SDM system 500.

Figure 7:
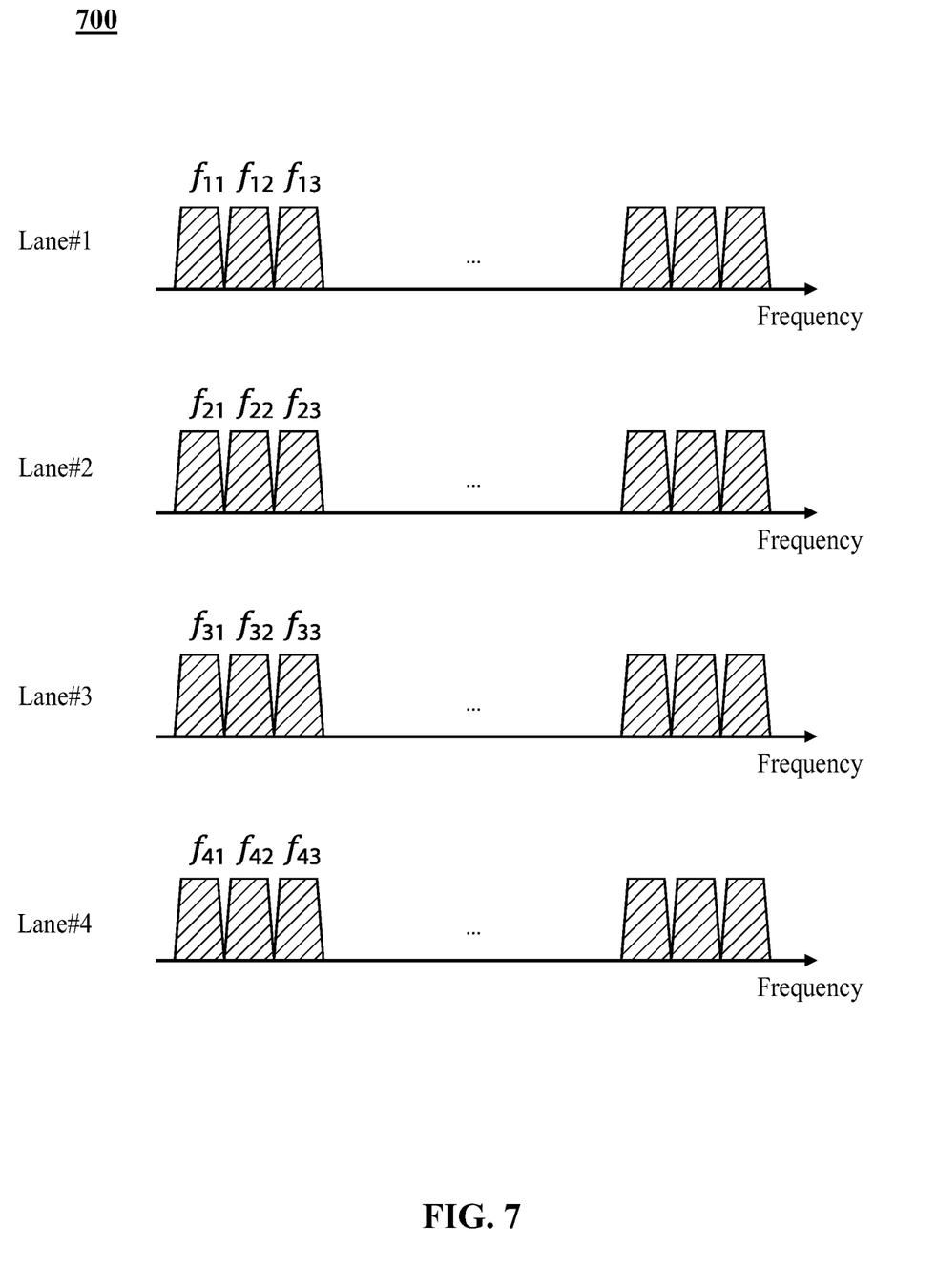
FIG. 7 illustrates different PT signals associated with a first non-limiting technique.

In the first non-limiting technique, each transmitter, for example, transmitters 502-1, 502-2, . . . 502-8, may generate a separate PT signal for each optical signal. Each PT signal may be generated at a different frequency. FIG. 7 illustrates different PT signals 700 associated with the first non-limiting technique. In the first technique, each transmitter may generate a separate PT signal to be modulated over the data signals. By way of example, in the first lane of the simplified SDM system 500, the first transmitter 502-1 may generate a first PT signal with frequency $f_{11}$, the second transmitter 502-2 may generate a second PT signal with frequency $f_{12}$ and so on. In the second lane of the simplified SDM system 500, the first transmitter 502-3 may generate a first PT signal with frequency $f_{21}$, the second transmitter 502-4 may generate a second PT signal with frequency $f_{22}$ and so on. In the third lane of the simplified SDM system 500, the first transmitter 502-5 may generate a first PT signal with frequency $f_{31}$, the second transmitter 502-6 may generate a second PT signal with frequency $f_{32}$ and so on. In the fourth lane of the simplified SDM system 500, the first transmitter 502-7 may generate a first PT signal with frequency $f_{41}$, the second transmitter 502-8 may generate a second PT signal with frequency $f_{42}$ and so on.

Figure 8:
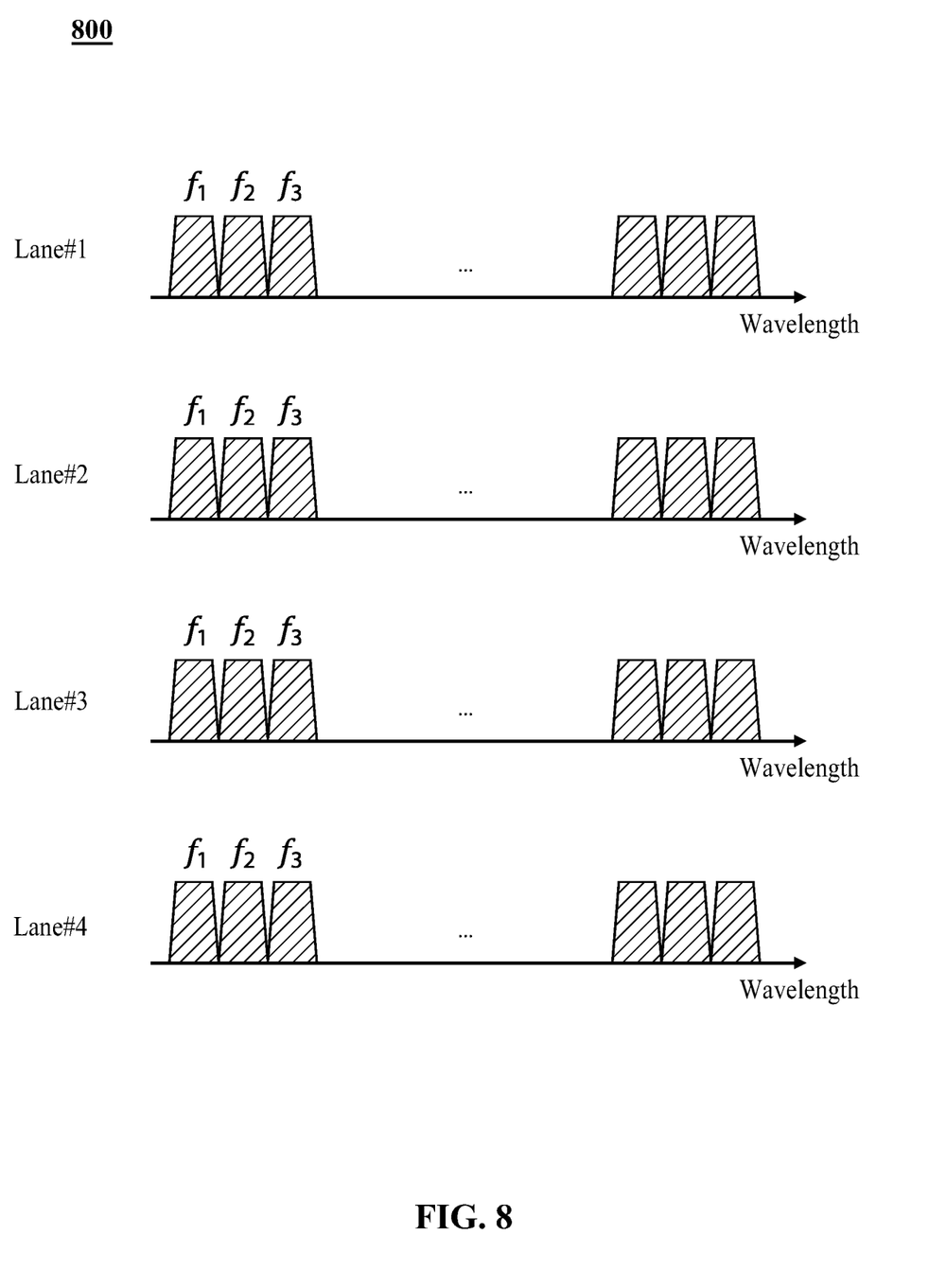
FIG. 8 illustrates different PT signals associated with a second non-limiting technique.

In the second non-limiting technique, each transmitter, for example, transmitters 502-1, 502-2, . . . 502-8, may operate in synchronization and generate PT signal in a time division multiplexing manner for each optical signal. Different optical signals having same wavelength propagating in different lanes may be modulated with a same PT signal, provided at a given instant of time only one of the different optical signals is modulated with the same PT signal. In other words, when one transmitter is generating a PT signal at frequency $f_1$ at a given instant of time, other transmitters may be prohibited from generating and transmitting the PT signals at using the same frequency $f_1$.

FIG. 8 illustrates different PT signals 800 associated with the second non-limiting technique. In the second technique, at a given instant of time, only the transmitters associated with a given lane may modulate the associated data signals. By way of example, at first instant of time, only the transmitters associated with the first lane (for example, transmitter 502-1 and 502-2) may modulate the optical signals with $f_1, f_2, f_3$ . . . and so on. At second instant of time, only the transmitters associated with the second lane (for example, transmitter 502-3 and 502-4) may modulate the optical signals with $f_1, f_2, f_3$ . . . and so on. At third instant of time, only the transmitters associated with the third lane (for example, transmitter 502-5 and 502-5) may modulate the optical signals with $f_1, f_2, f_3$ . . . and so on. At fourth instant of time, only the transmitters associated with the fourth lane (for example, transmitter 502-7 and 502-8) may modulate the optical signals with $f_1, f_2, f_3$ . . . and so on.

Figure 9:
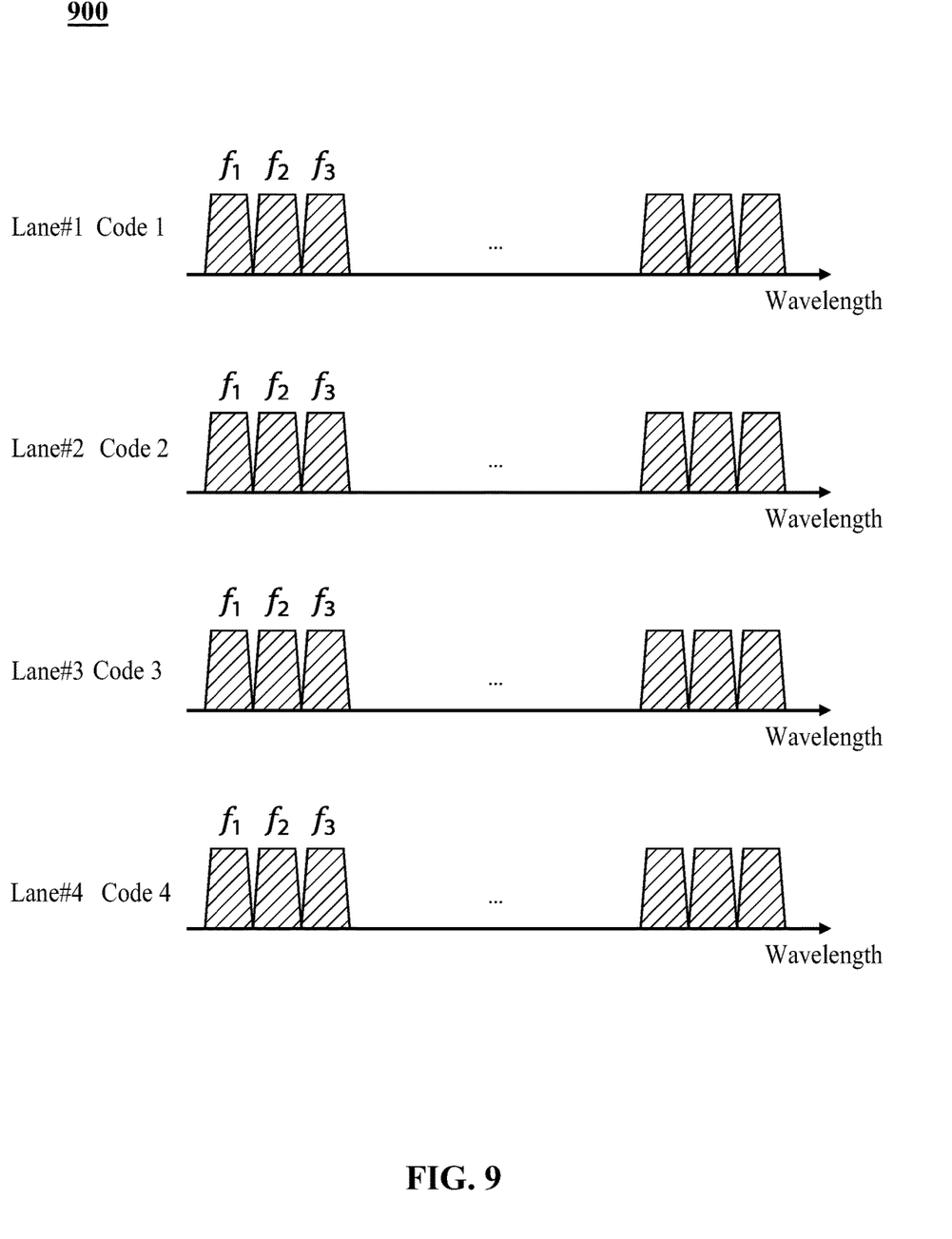
FIG. 9 illustrates different PT signals associated with a third non-limiting technique.

In the third non-limiting technique, PT signals associated with each lane may be multiplexed with a unique code. In other words, transmitters associated with a given lane may generate the PT signals and multiplex a unique code with the PT signals. FIG. 9 illustrates different PT signals 900 associated with the third non-limiting technique. In the third non-limiting technique, PT signals associated with each lane may be recognized by based on the unique code for that lane.

By way of example, in the first lane, PT signals generated at frequencies $f_1, f_2, f_3$ . . . and so on may be multiplexed with a first code $c_1$. In the second lane, PT signals generated at frequencies $f_1, f_2, f_3$ . . . and so on may be multiplexed with a second code $c_2$. In the third lane, PT signals generated at frequencies $f_1, f_2, f_3$ . . . and so on may be multiplexed with a third code $c_3$. In the fourth lane, PT signals generated at frequencies $f_1, f_2, f_3$ . . . and so on may be multiplexed with a fourth code $c_4$ and so on.

It is contemplated that any other suitable technique may be used to modulate the data signal with PT signals as long as the PT signals are capable of being identified separately by the PTD 510.

Returning to the FIG. 6, the PT modulator 602 may modulate the data signal with a PT signal based on any suitable techniques discussed above. The DAC 608 may convert the PT modulated data signal to an analog signal. The EOC 612 may convert the analog signal into an optical signal by using a light signal from the laser 610. The transmitter 600 may transmit the optical signal over the optical fiber (for example, optical fiber 522-1) associated with one of the lanes of the simplified SDM system 500. It is contemplated different transmitters, for example, transmitters 502-1, 502-2, . . . 502-8 may be configured to transmit different optical signals modulated with different PT signals.

Referring to FIG. 5, the optical coupler 508 may extract some power from the optical signals propagating in the optical fibers 522-1, 522-2, 522-3, and 522-4 and combine them. The optical coupler 508 may provide the combined optical signal to the PTD 510. The PTD 510 may be configured to determine PT signals modulated over the optical signals. Based on the PT signals, the PTD 510 may determine optical signal specific information included in the PT signals. Further, the PTD 510 may compute optical power of each optical signal based on the optical signal specific information to monitor the optical performance of the simplified SDM system 500.

It is contemplated that the optical performance in the simplified SDM system 500 may be monitored at more one location. To monitor optical performance at another location, the simplified SDM system 500 may have another optical coupler 514 coupled to the optical fibers 522-1, 522-2, 522-3, and 522-4 and another PTD 516 coupled to the optical coupler 514.

Figure 10:
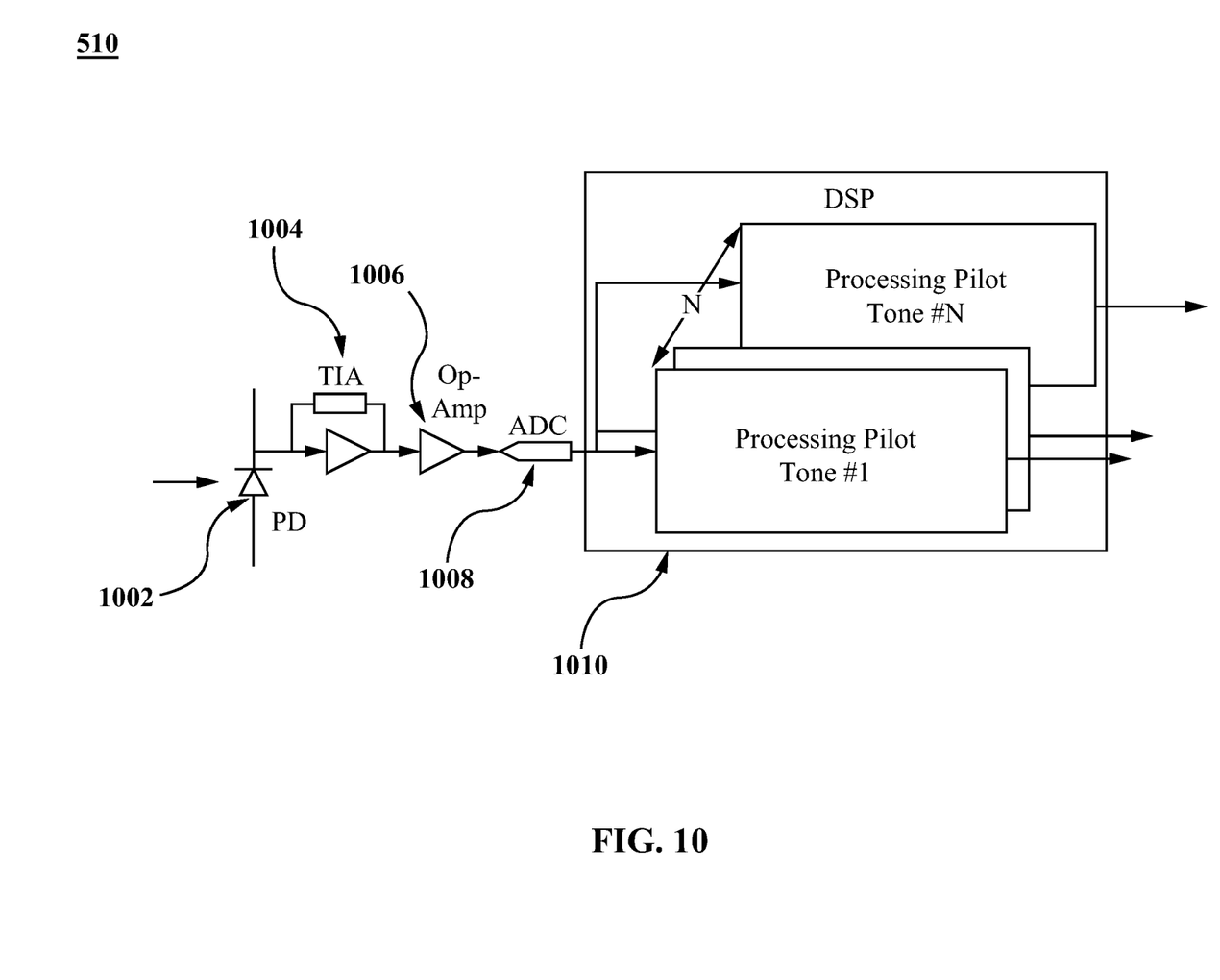
FIG. 10 illustrates a pilot tone detector (PTD), in accordance with various embodiments of present disclosure

FIG. 10 illustrates the PTD 510, in accordance with various embodiments of present disclosure. As shown, PTD 510 may include a photodetector (PD) 1002, a transimpedance preamplifier (TIA) 1004, an electrical amplifier 1006, an analog-to-digital converter (ADC) 1008 and a digital signal processor (DSP) 1010. It is to be noted that PTD 510 may include other components and modules but have been omitted from the FIG. 10 for the purpose of simplicity and tractability.

The PD 1002 may be configured to receive the combined optical signal from the optical coupler 508 and may convert it into a weak electrical signal. The PD 1002 may provide the weak electrical signal to the TIA 1004 that converts the weak electrical signal into an output electrical signal strong enough to be noise-tolerant and strong enough for further processing. The output of TIA 1004 may be provided to electrical amplifier 1006 for further amplification. The amplified electrical signal is then converted to digital signals by ADC 1008 and is supplied to DSP 1010. For each lane in the simplified SDM system 500, the DSP 1010 may be configured to extract PT signals from each optical signal propagating in the lane.

As previously discussed, the optical signals in different lanes may be modulated with PT signals in such a manner that the PTD 510 may separate and extract them from the combined optical signals. In other words, the DSP 1010 may be configured to extract different PT signals from the combined optical signals associated with different optical signals propagating in different lanes of the simplified SDM system 500. The DSP 1010 may be further configured to process the different PT signals to monitor the optical performance of the simplified SDM system 500.

It is to be noted that, using PTD 510 circumvents the need for high-speed components required for pilot tone detection as the tone frequency range is only up to several tens of MHz. Moreover, a single PTD 510 along with the optical coupler 508 may be used to monitor all the optical signals propagating in different lanes of the simplified SDM system 500 without utilizing any expensive OPMs.

Figure 11:
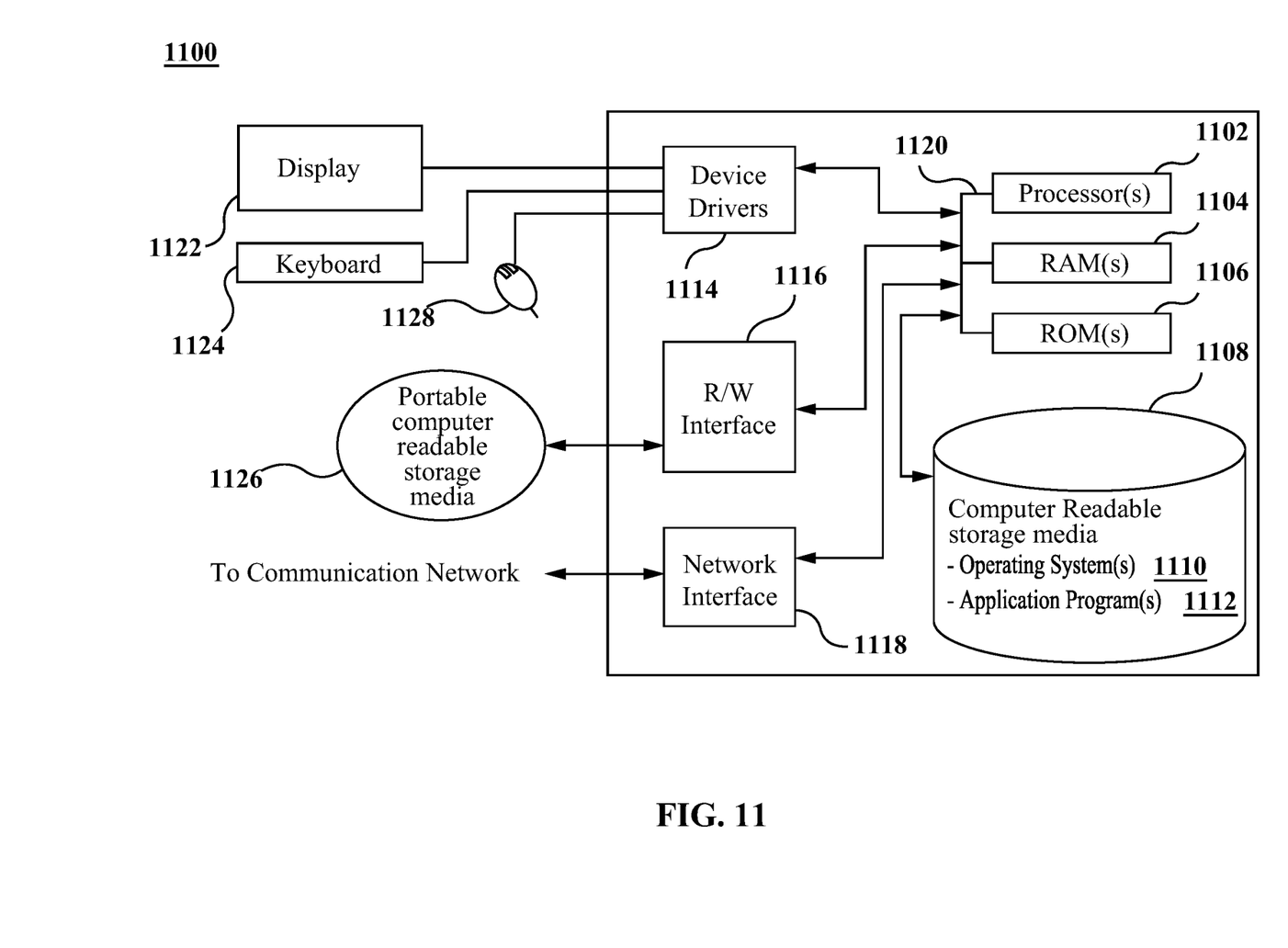
FIG. 11 depicts a high-level block diagram of exemplary components of a digital signal processor, in accordance with various embodiments of the present disclosure.

FIG. 11 depicts a high-level block diagram of exemplary components of the DSP 1010, in accordance with various embodiments of the present disclosure. It should be appreciated that FIG. 11 provides only an illustration of one implementation of the DSP 1010 and does not imply any limitations with regard to the environments in which different embodiments may be implemented. Many modifications to the depicted environment can be done to implement the DSP 1010 without departing from the principles presented herein. The DSP 1010 may be an ASIC chip, a server, a desktop computer, a laptop computer, or any device that may be configured to implement the present technology, as should be understood by a person skilled in the art.

As shown, the DSP 1010 employs one or more processors 1102, one or more computer-readable random access memories (RAMs) 1104, one or more computer-readable read only memories (ROMs) 1106, one or more computer-readable storage media 1108, device drivers 1114, a read/write (R/W) driver interface 1116, a network interface 1118, all interconnected over a communication fabric 1120. The communication fabric 1120 may be implemented by any architecture designed for passing data and/or control information between processors (such as microprocessors, communications and network processors, etc.), system memory, peripheral devices, and any other hardware components within a system.

The one or more operating systems 1110 and the one or more application programs 1112 are stored on the one or more of computer-readable storage media 1108 for execution by the one or more of the processors 1102 via the one or more of respective RAMs 1104 (which typically include a cache memory). In the illustrated embodiment, each of the computer-readable storage media 1108 may be a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1116 reads from and writes to one or more portable computer-readable storage media 1126. The application programs 1112 may be related to the simplified SDM system 500 and stored on the one or more of portable computer-readable storage media 1126, read via the respective R/W driver interface 1116 and loaded into the respective computer-readable storage media 1108.

Further, the network interface 1118 may be based on a TCP/IP adapter card or wireless communication adapter (such as a 4G wireless communication adapter using OFDMA technology). The application programs 1112 on the DSP 1010 may be downloaded to DSP 1010 from an external computer or external storage device via a communication network (for example, the Internet, a local area network or other wide area network or wireless network) and network interface 1118. From the network interface 1118, the application programs 1112 may be loaded onto the computer-readable storage media 1108. The DSP 1010 may connect to routers, firewalls, switches, gateway computers and/or edge servers of the communication network using copper wires, optical fibers, wireless transmission, and the like.

The DSP 1010 may also include a display screen 1122, a keyboard or keypad 1124, and a computer mouse or touchpad 1128. The device drivers 1114 may interface with display screen 1122 for imaging, with the keyboard or the keypad 1124, with computer mouse or touchpad 1128, and/or with display screen 1122 (which may be a touch sensitive display) for alphanumeric character entry and user selections. The device drivers 1114, R/W driver interface 1116 and network interface 1118 may comprise hardware and software (stored on the computer-readable storage media 1108 and/or the ROM 1106).

Figure 12:
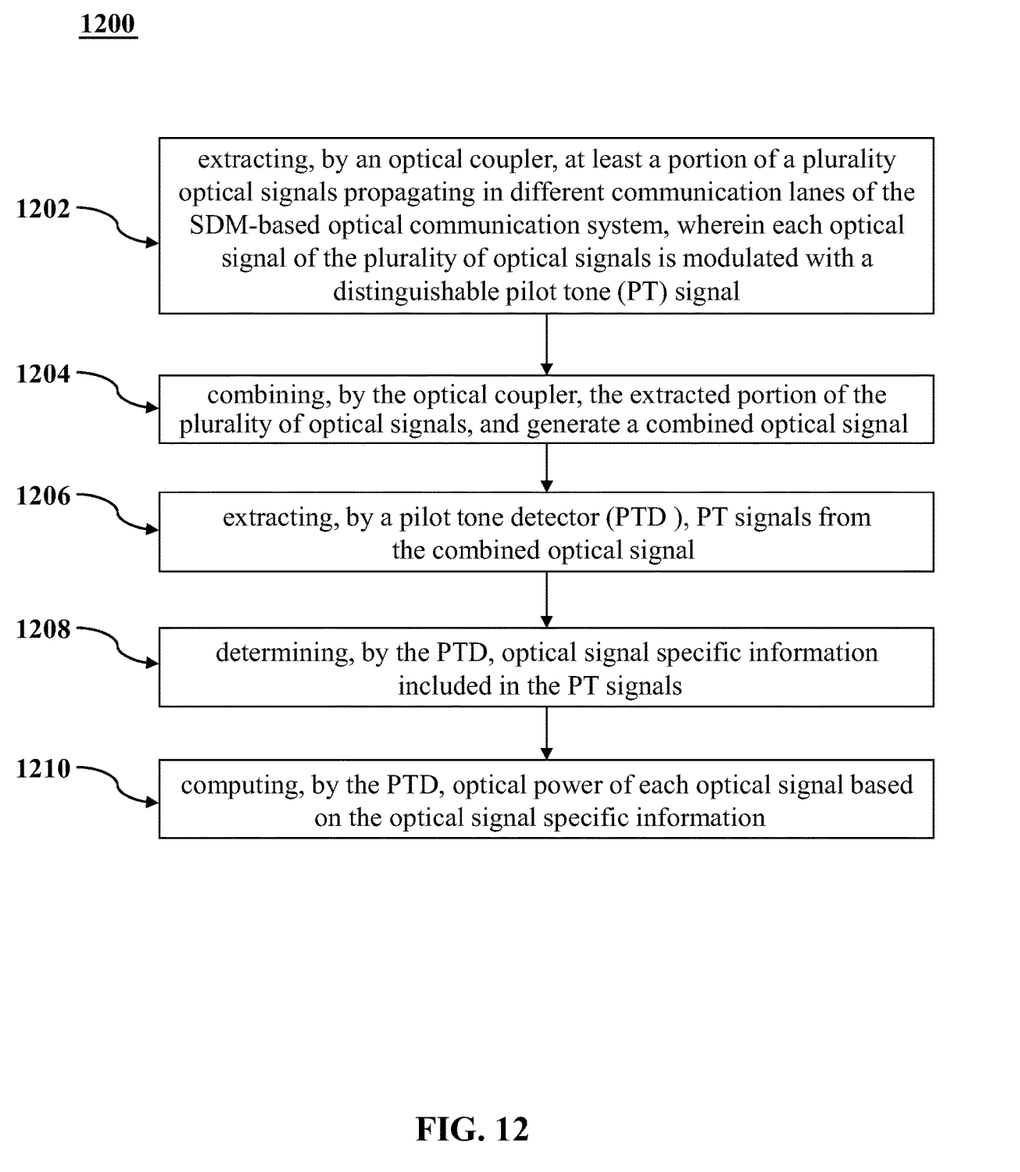
FIG. 12 illustrates a flowchart of a process for monitoring optical performance in the simplified SDM system, in accordance with various embodiments of the present disclosure.

FIG. 12 illustrates a flowchart of a process 1200 for monitoring optical performance in the simplified SDM system 500, in accordance with various embodiments of the present disclosure. As shown, the process commences at step 1202, where the optical coupler 508 extracts at least a portion of a plurality optical signals propagating in different communication lanes of the simplified SDM system 500, wherein each optical signal of the plurality of optical signals is modulated with a distinguishable pilot tone (PT) signal. The process 1200 advances to step 1204, where the optical coupler 508 combines the extracted portion of the plurality of optical signals, and generate a combined optical signal.

The process 1200 moves to step 1206, where the PTD 510 extracts PT signals from the combined optical signal. The process 1200 proceeds to step 1208, the PTD 510 determines optical signal specific information included in the PT signals. Finally, at step 1210, the PTD 510 computes optical power of each optical signal based on the optical signal specific information.

It is to be understood that the operations and functionality of the simplified SDM system 500, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

The invention claimed is:

1. A system for monitoring optical performance in a spatial division multiplexing (SDM)-based optical communication system, comprising:
   an optical coupler configured to:
      extract at least a portion of a plurality of optical signals propagating in different communication lanes of the SDM-based optical communication system, wherein each optical signal of the plurality of optical signals is modulated with a distinguishable pilot tone (PT) signal, wherein different optical signals having same wavelength propagating in different communication lanes are modulated with a same PT signal, provided at a given instant of time only one of the different optical signals is modulated with the same PT signal;

combine the extracted portion of the plurality of optical signals, and generate a combined optical signal; and a pilot tone detector (PTD) configured to extract PT signals from the combined optical signal, determine optical signal specific information included in the PT signals, and compute optical power of each optical signal based on the optical signal specific information.

2. The system of claim 1, wherein each one of the plurality of optical signals is modulated with a different PT signal having a different operational frequency.

3. The system of claim 1, wherein a given set of optical signals associated with a given communication lane are modulated by a set of PT signals which are multiplexed with a unique code, the unique code being different for different communication lanes.

4. The system of claim 1, wherein the optical signal specific information includes one or more of central wavelength, modulation format, baud rate, spectrum shape, and source/destinations.

5. A spatial division multiplexing (SDM) based optical communication system comprising:

a plurality of communication lanes, each communication lane comprising:
a plurality of transmitters configured to modulate a plurality of optical signals with distinguishable pilot tone (PT) signals, wherein different optical signals having same wavelength propagating in different communication lanes are modulated with a same PT signal, provided at a given instant of time only one of the different optical signals is modulated with the same PT signal;
a multiplexer configured to multiplex the plurality of modulated optical signals;
an optical fiber configured to carry the multiplexed modulated optical signals;

an optical coupler coupled to the optical fiber of each communication lane and configured to:
extract at least a portion of the multiplexed modulated optical signals propagating in each communication lane;
combine the extracted portion of the multiplexed modulated optical signals, and generate a combined optical signal; and a pilot tone detector (PTD) configured to extract PT signals from the combined optical signal, determine optical signal specific information included in the PT signals, and compute optical power of each optical signal based on the optical signal specific information.

6. The system of claim 5, wherein each one of the plurality of optical signals is modulated with a different PT signal having a different operational frequency.

7. The system of claim 5, wherein a given set of optical signals associated with a given communication lane are modulated by a set of PT signals which are multiplexed with a unique code, the unique code being different for different communication lanes.

8. The system of claim 5, wherein the optical signal specific information includes one or more of central wavelength, modulation format, baud rate, spectrum shape, and source/destinations.

9. A method for monitoring optical performance in a spatial division multiplexing (SDM)-based optical communication system, comprising:

extracting, by an optical coupler, at least a portion of a plurality optical signals propagating in different communication lanes of the SDM-based optical communication system, wherein each optical signal of the plurality of optical signals is modulated with a distinguishable pilot tone (PT) signal, wherein different optical signals having same wavelength propagating in different communication lanes are modulated with a same PT signal, provided at a given instant of time only one of the different optical signals is modulated with the same PT signal;

combining, by the optical coupler, the extracted portion of the plurality of optical signals, and generate a combined optical signal;

extracting, by a pilot tone detector (PTD), PT signals from the combined optical signal;

determining, by the PTD, optical signal specific information included in the PT signals; and computing, by the PTD, optical power of each optical signal based on the optical signal specific information.

10. The method of claim 9, wherein each one of the plurality of optical signals is modulated with a different PT signal having a different operational frequency.

11. The method of claim 9, wherein a given set of optical signals associated with a given communication lane are modulated by a set of PT signals which are multiplexed with a unique code, the unique code being different for different communication lanes.

12. The method of claim 9, wherein the optical signal specific information includes one or more of central wavelength, modulation format, baud rate, spectrum shape, and source/destinations.

* * * * *